United States Patent
Kajiwara et al.

(10) Patent No.: US 7,198,299 B2
(45) Date of Patent: Apr. 3, 2007

(54) STRUCTURE OF PILLAR GARNISH FOR AUTOMOBILE

(75) Inventors: Hideki Kajiwara, Wako (JP); Junji Sugimoto, Wako (JP); Takamitsu Kasai, Haga-gun (JP); Nobumoto Sekiguchi, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 11/063,011

(22) Filed: Feb. 22, 2005

(65) Prior Publication Data

US 2005/0206198 A1    Sep. 22, 2005

(30) Foreign Application Priority Data

Mar. 5, 2004 (JP) .............................. 2004-062002

(51) Int. Cl.
*B60R 22/00* (2006.01)
(52) U.S. Cl. .................................. 280/801.1
(58) Field of Classification Search ............. 280/801.1, 280/808; 297/468, 469, 483
See application file for complete search history.

(56) References Cited

U.S. PATENT DOCUMENTS 5,050,905 A * 9/1991 Yokote ........................ 280/804

FOREIGN PATENT DOCUMENTS

JP    61-78064    5/1986

* cited by examiner

*Primary Examiner*—Faye M. Fleming
(74) *Attorney, Agent, or Firm*—Rankin, Hill, Porter & Clark LLP

(57) ABSTRACT

In a structure of a pillar garnish for an automobile, a leg is provided to protrude toward a webbing from a lower edge of a step formed at a lower end of one of an upper pillar garnish and a lower pillar garnish which are formed by dividing a pillar garnish section, and webbing guide is provided at a tip end of the leg. Therefore, even if a sink mark is created on a surface of the step of the upper pillar garnish corresponding to the position of the leg, the sink mark is covered with an upper end of the lower pillar garnish and thus invisible from the side of a vehicle compartment, so that it is possible to prevent the degradation of the appearance due to the creation of the sink mark. Moreover, a back of the lower pillar garnish is superposed on a surface of the step formed on the upper pillar garnish. Therefore, it is possible to prevent the generation of a difference in level at a joint between both of the pillar garnishes to enhance the appearance.

3 Claims, 5 Drawing Sheets

STRUCTURE OF PILLAR GARNISH FOR AUTOMOBILE

RELATED APPLICATION DATA

The Japanese priority application No. 2004-62002 upon which the present application is based is hereby incorporated in its entirety herein by reference.

BACKGROUND OF THE INVENTION

1. Field of the Invention

The present invention relates to a structure of a pillar garnish for an automobile in which a webbing guide for slidably guiding a webbing of a seat belt device is provided on a back of a pillar garnish section covering a pillar.

2. Description of the Related Art

A webbing of a seat belt device for an automobile is drawn from the inside of a vehicle compartment to a back of a pillar garnish and wound around a retractor. Japanese Utility Model Application Laid-open No. 61-78064 discloses a structure of a pillar garnish for an automobile, in which a webbing guide for slidably guiding a webbing is provided on a back of a pillar garnish, in order to prevent smooth sliding of the webbing from being obstructed by the webbing being rubbed against the pillar garnish.

In the conventional structure described above, a rib-shaped webbing guide is integrally formed on the back of the synthetic resin pillar garnish, whose surface faces the inside of a vehicle compartment. Therefore, the conventional structure suffers from a problem that a sink mark is created on the surface of the pillar garnish corresponding to the position of the webbing guide, resulting in the degradation of the appearance of the pillar garnish. Particularly, because the webbing guide is provided directly on the back of the pillar garnish, there is a disadvantage that the height of the webbing guide is increased to cause a considerable creation of sink marks.

SUMMARY OF THE INVENTION

Accordingly, it is an object of the present invention to prevent the degradation of the appearance of the pillar garnish due to the provision of the webbing guide.

To achieve the above object, according to a first aspect and feature of the present invention, there is provided a structure of a pillar garnish for an automobile in which a webbing guide for slidably guiding a webbing of a seat belt device is provided on a back of a pillar garnish section covering a pillar, wherein the pillar garnish section is divided into an upper pillar garnish and a lower pillar garnish, an end of one of the pillar garnishes being stepped downwards toward a back of such pillar garnish to form a step, a back of an end of the other pillar garnish being superposed on a surface of the step, and the webbing guide is provided at a tip end of a leg which protrudes from an end edge of the step toward the webbing; and wherein a plurality of guide beads are provided on the webbing guide at predetermined intervals in a direction perpendicular to a lengthwise direction of the webbing to extend in a curved manner in the lengthwise direction of the webbing, the length of the guide beads in the lengthwise direction of the webbing being set at a value larger than a weaving pitch of the webbing, the guide beads being curved so that opposite ends thereof are not in contact with the webbing.

With the arrangement of the first feature, the leg is provide to protrude toward the wedding from the end edge of the step formed at the end of one of the upper pillar garnish and the lower pillar garnish formed by dividing the pillar garnish section, and the webbing guide is provided at the tip end of the leg. Therefore, even if a sink mark is created on the surface of the end of the one pillar garnish corresponding to the position of the leg, the sink mark is covered with the end of the other pillar garnish and thus invisible from the side of a vehicle compartment, thereby preventing the degradation of the appearance due to the creation of the sink mark. Moreover, because the back of the end of the other pillar garnish is superposed on the surface of the step formed at the end of the one pillar garnish, it is possible to prevent the generation of a difference in level at a joint between both the pillar garnishes to enhance the appearance.

Further, the length of the plurality of guide beads provided on the webbing guide is larger than the weaving pitch of the webbing, and the guide beads are curved so that the opposite ends thereof are not in contact with the webbing. Therefore, when the webbing is slid along the guide beads, it is possible to prevent stitches of the webbing from being caught at the guide beads, to thereby enable the smooth sliding of the webbing. In addition, the webbing guide can be disposed at a location most suitable for the guidance of the webbing by adjusting the length of the leg.

According to a second aspect and feature of the present invention, in addition to the first feature, the back of the step and the leg are connected to each other by reinforcing ribs.

With the arrangement of the second feature, the back of the step and the leg are connected to each other by reinforcing ribs, and hence it is possible to increase the rigidity of the leg to which a load from the webbing is transmitted through the webbing guide, thereby stabilizing the guiding function of the webbing guide.

According to a third aspect and feature of the present invention, in addition to the first feature, the height of the guide beads is set at a value equal to or smaller than the thickness of the webbing.

With the arrangement of the third feature, the height of the guide beads is set at a value equal to or smaller than the thickness of the webbing, and hence even if the side edge of the webbing is dislocated from the guide beads, the side edge is prevented from being largely bent, thereby preventing an increase in sliding resistance.

A B-pillar in an embodiment corresponds to the pillar of the present invention.

The above and other objects, features and advantages of the invention will become apparent from the following description of the preferred embodiment taken in conjunction with the accompanying drawings.

DETAILED DESCRIPTION OF PREFERRED EMBODIMENT

The present invention will now be described by way of an embodiment shown in the accompanying drawings.

Figure 1:
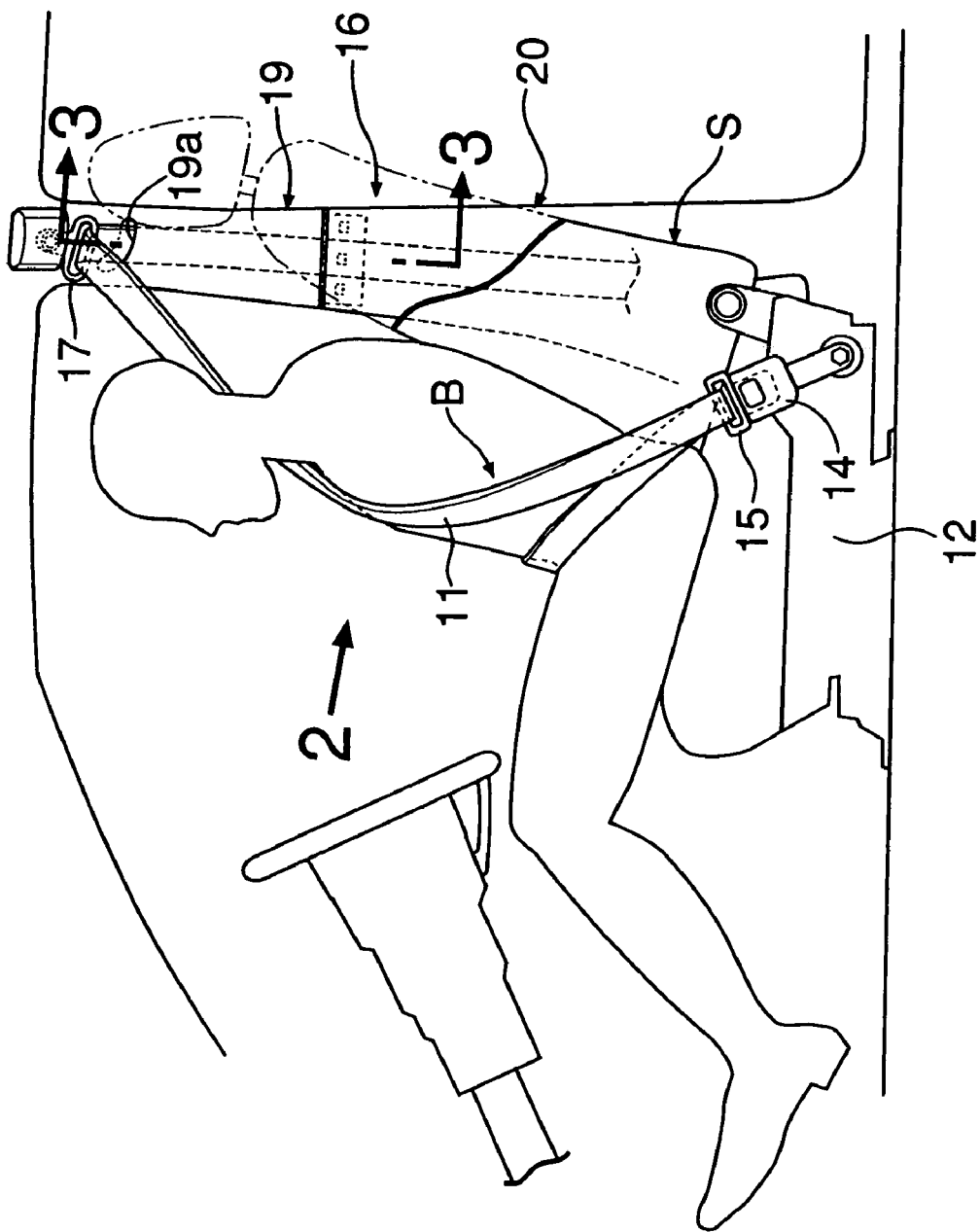
FIG. 1 is a side view of a seat in a front row of an automobile.
Figure 2:
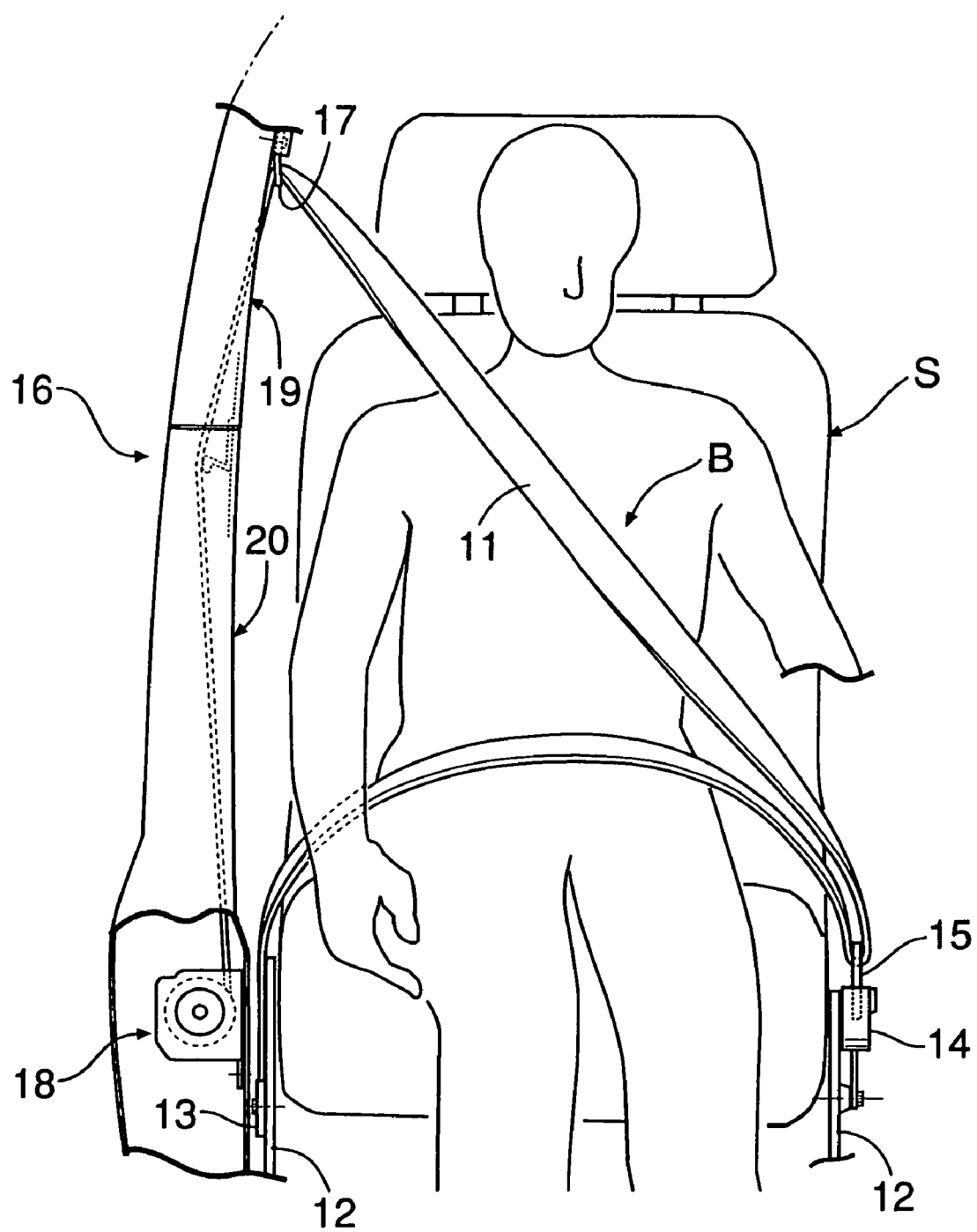
FIG. 2 is a view taken in a direction of an arrow 2 in FIG. 1.

Referring to FIGS. 1 and 2, a webbing 11 of a seat belt device B for restraining an occupant on a seat S in a front row, extends from one end fixed to an anchor 13 mounted on a right side of a seat base 12, through a tongue 15 detachably coupled to a buckle 14 mounted on a left side of the seat base 12, a through-anchor 17 mounted at an upper portion of a B-pillar 16 (a center pillar) and an inside of the B-pillar 16, so that the other end of the webbing 11 is wound up around a retractor 18. A side of the B-pillar on the side of a vehicle compartment is covered with an upper pillar garnish 19 made of a synthetic resin and a lower pillar garnish 20 made of a synthetic resin. The webbing 11 is guided through an opening 19a (see FIG. 3) formed in the upper pillar garnish 19 into the inside of the B-pillar 16.

Figure 3:
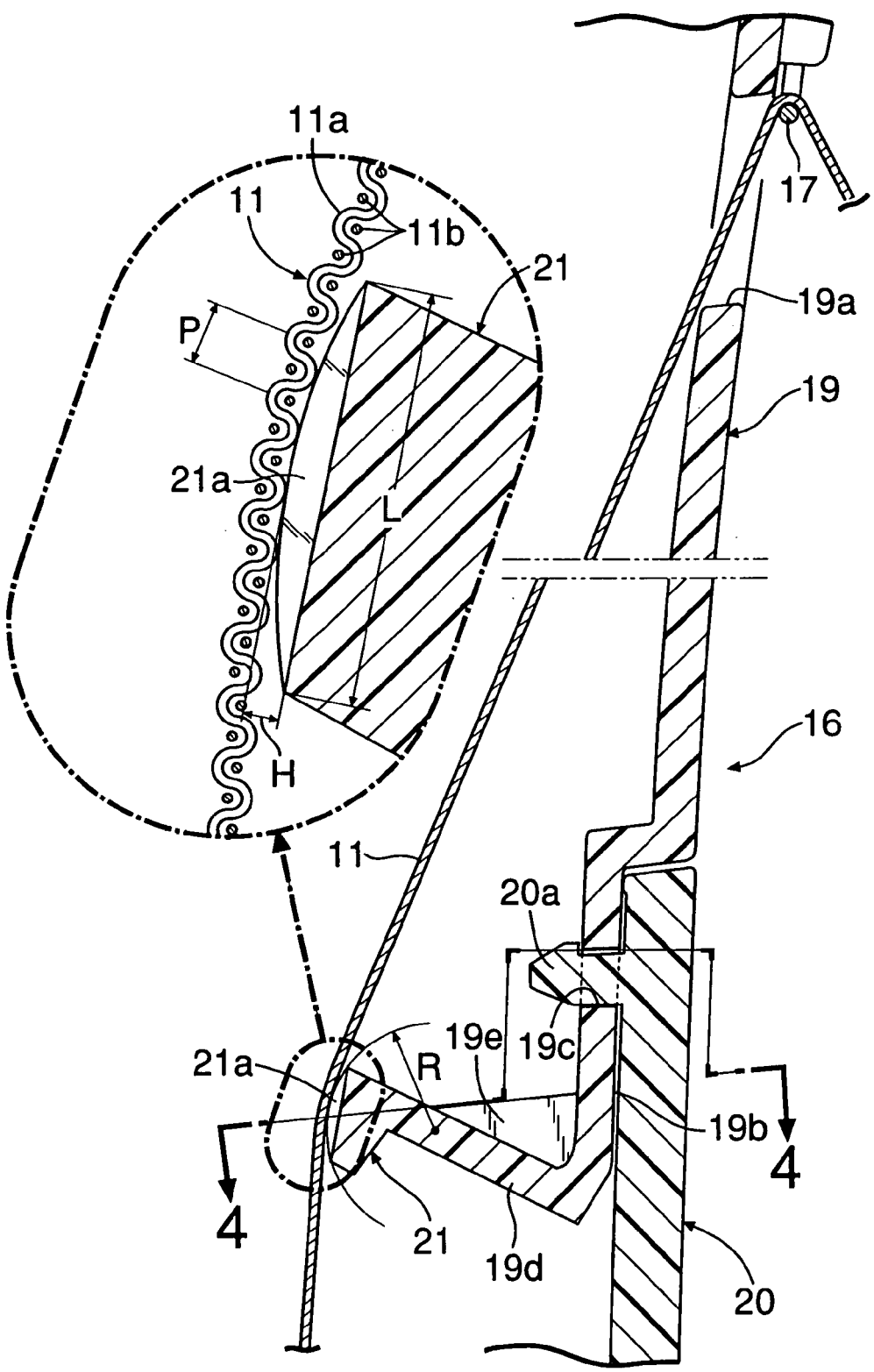
FIG. 3 is an enlarged sectional view taken along a line 3—3 in FIG. 1.
Figure 4:
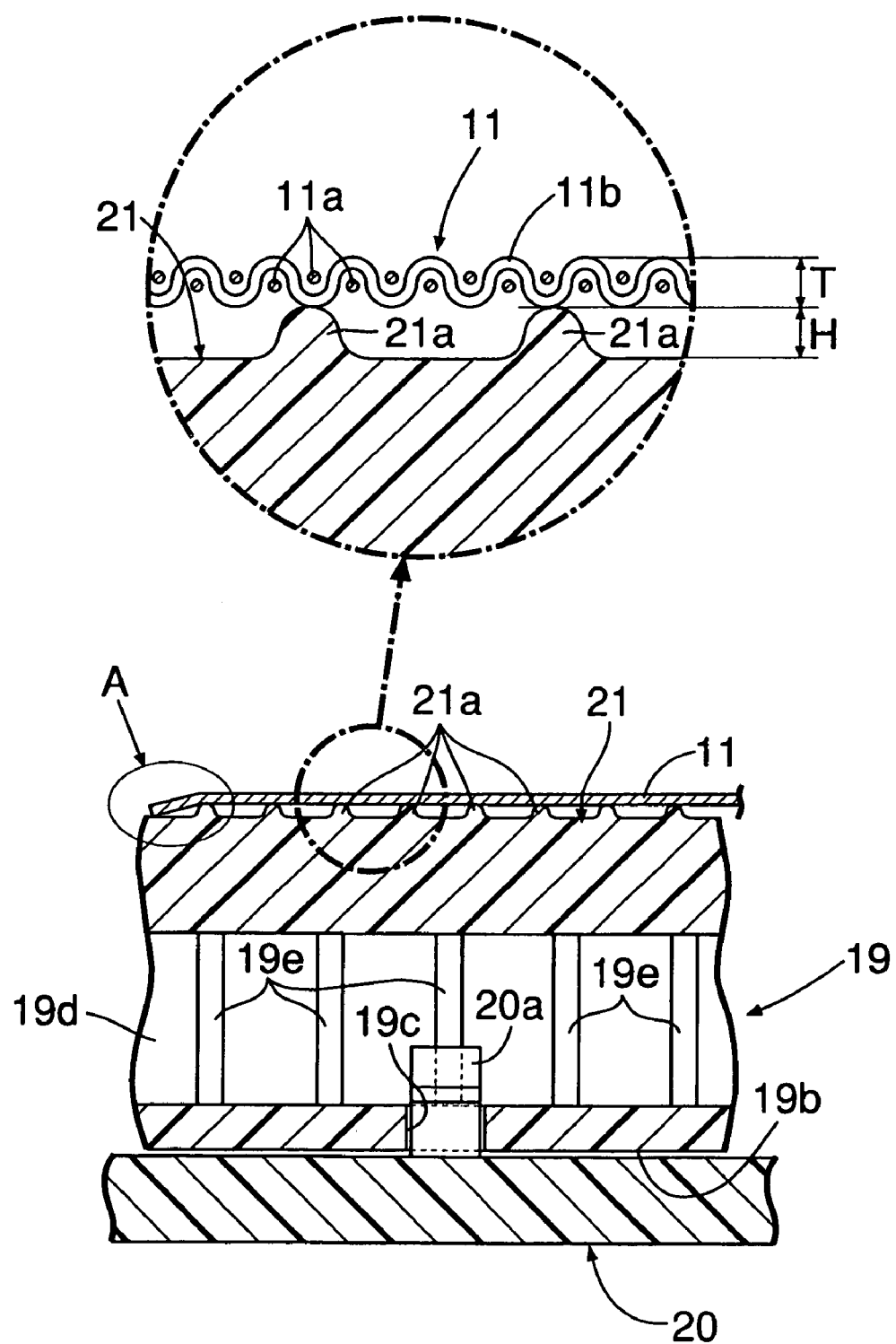
FIG. 4 is an enlarged sectional view taken along a line 4—4 in FIG. 3.
Figure 5:
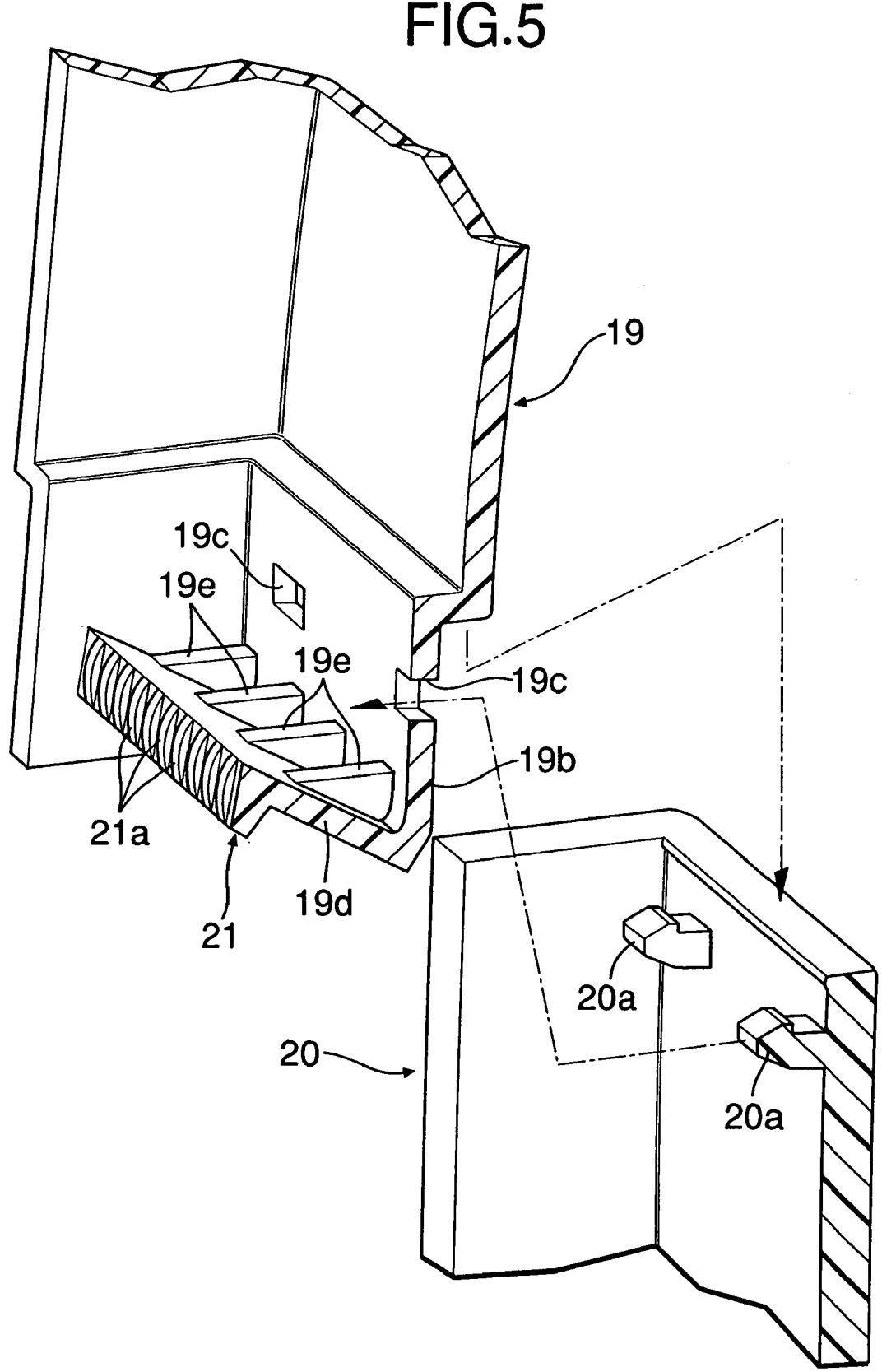
FIG. 5 is an enlarged perspective view of a joint between an upper pillar garnish and a lower pillar garnish.

As can be seen from FIGS. 3 to 5, a step 19b is formed at a lower end of the upper pillar garnish 19, and is stepped downwards from a surface (a face on the vehicle compartment) of the upper pillar garnish 19 toward a back (a face opposite from the vehicle compartment) of the upper pillar garnish 19. A back of an upper end of the lower pillar garnish 20 is superposed on a surface of the step 19b. The height of the step 19b generally coincides with the thickness of an upper end of the lower pillar garnish 20, and hence the surface of the lower end of the upper pillar garnish 19 and the surface of the upper end of the lower pillar garnish 20 are substantially flush with each other. A plurality of locking projections 20a protrude on the back of the upper end of the lower pillar garnish 20. The upper end of the upper pillar garnish 19 and the lower end of the lower pillar garnish 20 are coupled to each other by inserting the locking projections 20a into a plurality of locking holes 19c formed in the step 19b of the upper pillar garnish 19, to thereby lock the locking projections 20a in the locking holes 19c.

A plate-shaped leg 19d protrudes diagonally upwards from a lower edge of the step 19b of the upper pillar garnish 19 toward the webbing 11. The leg 19d and a back of the step 19b are connected to each other by a plurality of triangular reinforcing ribs 19e. A webbing guide 21 is integrally formed at the tip end of the leg 19d to extend in a direction perpendicular to a lengthwise direction of the webbing 11. A large number of guide beads 21a are projectingly provided at predetermined intervals on a face of the webbing guide 21 opposed to the webbing 11, to extend in a rib-shape in the lengthwise direction, so that the webbing 11 drawn out from the retractor 18 or drawn into the retractor 18 is guided smoothly on the guide beads 21a.

Each of the guide beads 21a has a portion which is in sliding contact with the webbing 11 and which is curved in an arcuate shape. The radius R of curvature of the curved portion is smaller than the radius of curvature of the webbing 11 which is in contact with the guide beads 21a. The webbing 11 also includes a warp 11a extending in the lengthwise direction of the webbing 11, and a weft 11b extending in the direction perpendicular to the lengthwise direction of the webbing 11. The length L of the guide beads 21a is set at a value larger than a weaving pitch P of the warp 11a. Further, the height H of the guide beads 21a is set so that it is equal to or smaller than the thickness T of the webbing 11.

The operation of the embodiment of the present invention having the above-described arrangement will be described below.

The leg 19d is provided to protrude from the lower edge of the step 19b at the lower end of the upper pillar garnish 19 toward the webbing 11, and the webbing guide 21 is provided at the tip end of the leg 19d. Therefore, even if a sing mark is created on the surface of the step 19b due to the protrusion of the leg 19d, the sink mark can be hidden by an upper end of the lower pillar garnish 20 superposed on the surface of the step 19b, thereby preventing the degradation of the appearance due to the creation of the sink mark. In addition, because the back of the upper end of the lower pillar garnish 20 is superposed on the surface of the step 19b at the lower end of the upper pillar garnish 19, it is possible to prevent the generation of a difference in level at a joint between the upper pillar garnish 19 and the lower pillar garnish 20, leading to an enhancement in appearance. Further, because the leg 19d is connected to the back of the step 19b by the reinforcing ribs 19e, it is possible to prevent the leg 19d from being flexed by a load applied thereto from the webbing 11, to stabilize the function of guiding the webbing 11 by the guide beads 21a.

Additionally, because the radius R of curvature of the tip end of each guide beads 21a is smaller than the radius of curvature of the webbing 11 which is contact with the guide beads 21a, opposite ends of each guide bead 21a are spaced apart from the webbing 11. Therefore, when the webbing 11 is slid while being guided by the guide beads 21a, the webbing 11 cannot be caught at the ends of the guide beads 21a. Moreover, because the length L of the guide beads 21a is set at the value larger than the weaving pitch P of the warp 11a of the webbing 11, the guide beads 21a can be prevented from being caught into a valley between crests of the warp 11a of the webbing 11 to obstruct the smooth sliding of the webbing 11. Further, because the height H of the guide beads 21a is equal to or smaller than the thickness T of the webbing 11, even if the side edge of the webbing 11 is dislocated from the outermost guide bead 21a to become bent (see a portion indicated by A in FIG. 4), an increase in bent angle can be prevented to minimize an increase in sliding resistance of the webbing 11d. Yet further, the webbing guide 21 can be disposed at a location most suitable for the guidance of the webbing 11 by adjusting the length of the leg 19d.

Although the embodiment of the present invention has been described in detail, it will be understood that the present invention is not limited to the above-described embodiment, and various modifications in design may be made without departing from the subject matter of the invention defined in the claims.

For example, the B-pillar 16 of the automobile has been illustrated in the embodiment, but the present invention is also applicable to a C-pillar located sideways of a seat in a back row, and further applicable to a D-pillar located sideways of a seat in a third row in an RV vehicle or the like.

What is claimed is:

1. A structure of a pillar garnish for an automobile in which a webbing guide for slidably guiding a webbing of a seat belt device is provided on a back of a pillar garnish section covering a pillar, wherein the pillar garnish section is divided into an upper pillar garnish and a lower pillar garnish, an end of one of the pillar garnishes being stepped downwards toward a back of the pillar garnish to form a step, a back of an end of the other pillar garnish being superposed on a surface of the step, and the webbing guide is provided at a tip end of a leg which protrudes from an end edge of the step toward the webbing; and wherein a plurality of guide beads are provided on the webbing guide at predetermined intervals in a direction perpendicular to a lengthwise direction of the webbing to extend in a curved manner in the lengthwise direction of the webbing, the length of the guide beads in the lengthwise direction of the webbing being set at a value larger than a weaving pitch of the webbing, the guide beads being curved so that opposite ends thereof are not in contact with the webbing.

2. A structure of a pillar garnish for an automobile according to claim 1, wherein the back of the step and the leg are connected to each other by reinforcing ribs.

3. A structure of a pillar garnish for an automobile according to claim 1, wherein the height of the guide beads is set at a value equal to or smaller than the thickness of the webbing.

* * * * *